(12) United States Patent
Li et al.

(10) Patent No.: US 7,917,361 B2
(45) Date of Patent: Mar. 29, 2011

(54) SPOKEN LANGUAGE IDENTIFICATION SYSTEM AND METHODS FOR TRAINING AND OPERATING SAME

(75) Inventors: Haizhou Li, Singapore (SG); Bin Ma, Singapore (SG); George M. White, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 944 days.

(21) Appl. No.: 11/575,479

(22) PCT Filed: Sep. 19, 2005

(86) PCT No.: PCT/IB2005/002760
§ 371 (c)(1),
(2), (4) Date: Jun. 27, 2007

(87) PCT Pub. No.: WO2006/030305
PCT Pub. Date: Mar. 23, 2006

(65) Prior Publication Data
US 2007/0299666 A1    Dec. 27, 2007

Related U.S. Application Data

(60) Provisional application No. 60/611,022, filed on Sep. 17, 2004.

(51) Int. Cl.
*G10L 15/06* (2006.01)
*G10L 15/00* (2006.01)
(52) U.S. Cl. ......... 704/243; 704/231; 704/236; 704/254
(58) Field of Classification Search .................. None
See application file for complete search history.

(56) References Cited

U.S. PATENT DOCUMENTS 5,689,616 A    11/1997 Li .................................. 395/2.41
(Continued)

FOREIGN PATENT DOCUMENTS

TW    508564 B    11/2002

OTHER PUBLICATIONS

Navratil, J.; Zuhlke, W.; "An efficient phonotactic-acoustic system for language identification," Acoustics, Speech and Signal Processing, 1998. Proceedings of the 1998 IEEE International Conference on, May 12-15, 1998, pp. 781-784 vol. 2.*

(Continued)

*Primary Examiner* — Matthew J Sked
(74) *Attorney, Agent, or Firm* — Paul J. Backofen, Esq.; Crockett & Crockett, PC

(57) ABSTRACT

A method for training a spoken language identification system to identify an unknown language as one of a plurality of known candidate languages includes the process of creating a sound inventory comprising a plurality of sound tokens, the collective plurality of sound tokens provided from a subset of the known candidate languages. The method further includes providing a plurality of training samples, each training sample composed within one of the known candidate languages. Further included is the process of generating one or more training vectors from each training database, wherein each training vector is defined as a function of said plurality of sound tokens provided from said subset of the known candidate languages. The method further includes associating each training vector with the candidate language of the corresponding training sample.

18 Claims, 4 Drawing Sheets

U.S. PATENT DOCUMENTS

| | | | |
|---|---|---|---|
| 5,805,771 A * | 9/1998 | Muthusamy et al. | 704/232 |
| 6,029,124 A * | 2/2000 | Gillick et al. | 704/200 |
| 6,085,160 A * | 7/2000 | D'hoore et al. | 704/256.2 |
| 6,675,143 B1 * | 1/2004 | Barnes et al. | 704/257 |
| 7,319,958 B2 * | 1/2008 | Melnar et al. | 704/254 |
| 7,689,404 B2 * | 3/2010 | Khasin | 704/1 |
| 2002/0128827 A1 | 9/2002 | Bu et al. | |
| 2003/0233233 A1 | 12/2003 | Hong | |
| 2004/0158466 A1 * | 8/2004 | Miranda | 704/236 |

OTHER PUBLICATIONS

K. M. Berkling et al., "Language Identification of Six Languages Based on a Common Set of Broad Phonemes," Proc. International Conference on Spoken Language Processing, vol. 4, pp. 1891-1894, 1994.

C. Corredor-Ardoy et al., "Language Identification with Language-Independent Acoustic Models," Proc. Eurospeech, vol. 1, pp. 55-58, 1997.

H. Li et al., "A Phonotactic Language Model for Spoken Language Identification," Proc. 43$^{rd}$ Annual Meeting of the Association for Computational Linguistics, pp. 515-522, Jun. 2005.

B. Ma et al., "Spoken Language Identification Using Bag-of-Sounds," Proe. International Conference on Chinese Computing, Mar. 2005.

M. A. Zissman et al., "Automatic Language Identification" Speech Communications, vol. 35, No. 1-2, pp. '115-124, 2001.

Y. K. Muthusamy et al., "Reviewing Automatic Language Identification," IEEE Signal Processing Magazine, vol. 11, No. 4, pp. 33-41, Oct. 1994.

Kwan H. et al., *Recognized Phoneme-Based N-Gram Modeling in Automatic Language Identification*, 4$^{th}$ European Conference on Speech Communication and Technology, (Eurospeech), Madrid:Graficas Brens, ES, vol. 2 Conf. 4, Sep. 18, 1995, pp. 1367-1370.

M. A. Zissman, "Comparsion of Four Approaches to Automatic Language Identification of Telephone Speech," vol. 4, No. 1, pp. 31 and 36, Jan. 1996.

"Spoken Language Processing; A Guide to Theory, Algorithm, and System Development", Huang, et al., Prentice Hall PTR, 2001, pp. 552 and 553.

\* cited by examiner

| Length | MAN | ENG | KOR | JPN | SHH | CAN | Ave |
|---|---|---|---|---|---|---|---|
| 5 s | 9.4 | 8.8 | 5.8 | 5.9 | 10.8 | 9.4 | 8.4 |
| 10 s | 4.0 | 1.2 | 0.8 | 2.4 | 1.8 | 1.2 | 1.9 |
| 15 s | 1.8 | 0.6 | 0.2 | 1.6 | 0.0 | 0.0 | 0.7 |

|  | AP |  | BOS |  |
|---|---|---|---|---|
| Training Sessions | 10,000 | 10,000 | 2,000 | 10,000 |
| Phoneme bi-gram | No | Yes | No | No |
| Error Rate (%) | 3.0 | 1.6 | 0.4 | 0.2 |

SPOKEN LANGUAGE IDENTIFICATION SYSTEM AND METHODS FOR TRAINING AND OPERATING SAME

CROSS REFERENCE TO RELATED APPLICATIONS

This application claims the benefit of priority to U.S. Provisional Application No. 60/611,022 filed Sep. 17, 2004, the contents of which are herein incorporated by reference in its entirety for all purposes.

BACKGROUND

The present invention relates to language identification systems and methods for training and operating said systems.

With the growth of globalization, international business, and security considerations, multilingual speech applications are in strong demand, in particular automatic language identification (LID). Possible applications of automatic language identification include automatic call routing, audio mining, and voice automated attendant systems.

Acoustic-phonotactic based LIDs represent one type of language identification system employed in the art, an illustration of which is shown in FIG. 1. The system typically includes four stages operable to process a speech segment and to classify it into one of a number of possible candidate languages. Initially the system is trained, whereby the system is programmed to recognize particular features of each of the candidate languages. Subsequent to training, language identification operations are performed, whereby a speech sample of unknown language is processed and compared to the previously-programmed features to determine presence or absence of said features, the candidate language possessing the greatest number of correlations with the sample being deemed the language of the sample.

The conventional system suffers from several disadvantages, one being that a language specific development effort is needed to add a new candidate language. This requirement gives rise to high costs in the acoustic and language modeling and speech data transcription efforts needed. Accordingly, the conventional system is not very scalable with respect to adding new languages.

What is therefore needed is an improved spoken language identification system which provides better scalability with the addition of new candidate languages.

SUMMARY

The present invention provides a system and method for identifying spoken language using only a subset of the candidate languages' sound alphabet. Because only a subset of the candidates' sound alphabet is used, speech training and identification operations are faster and more memory efficient.

In one representative embodiment, a method for training a spoken language identification system to identify an unknown language as one of a plurality of known candidate languages is presented, the method including the process creating a sound inventory comprising a plurality of sound tokens, the collective plurality of sound tokens provided from a subset of the known candidate languages. The method further includes providing a plurality of training samples, each training sample composed within one of the known candidate languages. Further included is the process of generating one or more training vectors from each training sample, wherein each training vector is defined as a function of said plurality of sound tokens provided from said subset of the known candidate languages. The method further includes associating each training vector with the candidate language of the corresponding training sample.

These and other features of the invention will be better understood when viewed in light of the following drawings and detailed description of exemplary embodiments.

Figure 1:
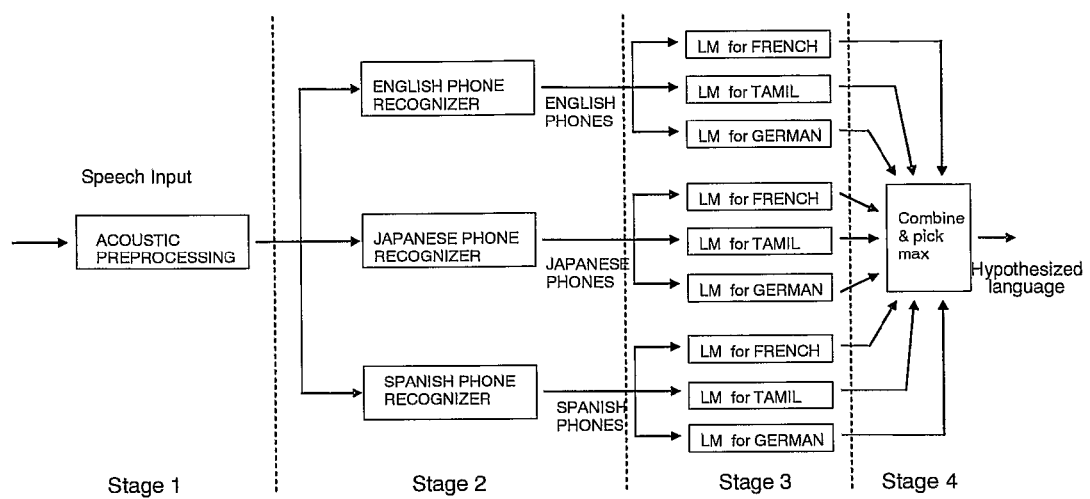
FIG. 1 illustrates a spoken language identification system known in the art.

For clarity previously identified features retain their reference numerals in subsequent drawings.

DETAILED DESCRIPTION OF EXEMPLARY EMBODIMENTS

Language Identification System

Figure 2:
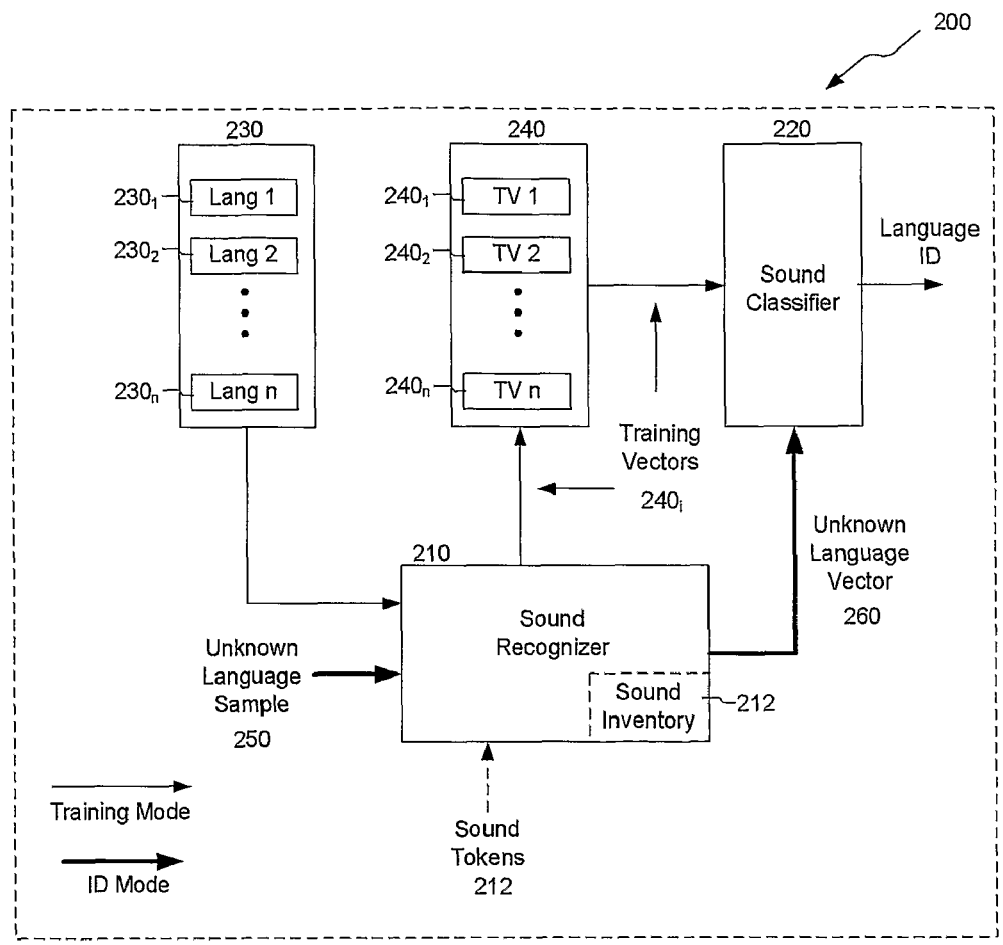
FIG. 2 illustrates a spoken language identification system in accordance with the present invention

FIG. 2 illustrates a spoken language identification system in accordance with the present invention. The system 200 includes a sound recognizer 210 and a sound classifier 220. Optionally, the system 200 may include a database 230 for storing training samples $232_{1-n}$, and a database 240 for storing training vectors $242_{1-n}$. Alternatively, databases 230 and 240 may be located remotely from the system 200.

The sound recognizer 200 includes an input coupled to receive training samples $230_{1-n}$, the sound recognizer 200 also operable to receive (either via the same input or another input) an unknown language sample 250. The reader will appreciate that the training and/or unknown language samples may be provided in several different forms, e.g., as live or recorded sound, the speech itself being in any format, e.g., analog or digital forms.

Each training sample $230_i$ includes one or more predefined speech utterances composed in one of the candidate languages which are to be identified by the system. The one or more training utterances defining each training sample $230_i$ are selected to provide a majority of the phonemes or other phonotactical markers employed in that particular candidate language. Each training sample may employ any number of training utterances of any duration, an exemplary embodiment being between 100-3000 separate training utterances employed, each speech utterance being between 5 and 15 seconds long. Further exemplary, the unknown speech sample 250 is of a similar duration as the speech utterances, for example, between 5-15 seconds in duration.

The sound recognizer 210 is operable to generate a training vector $240_i$ from a received training sample $230_i$ during system operation in the language training mode, and to generate an unknown language vector 260 from the unknown language sample 250 during operation in the identification mode. The generated training and unknown language vectors 240$_i$ and 260 (both described below) are supplied to database 240 and the sound classifier 220, respectively, as shown. In an alternative embodiment of the invention, the sound recognizer 210 is configured to generate training vectors for each one or combination of the speech utterances included within each training sample 230$_i$. In such an instance, the resulting training vectors corresponding to the different speech utterances in the same training sample are collectively processed to form a statistical model used in the language identification process, as will be further described below.

In both the training and identification modes of operation, the sound recognizer 210 generates the training and unknown language vectors 240$_i$ and 260 as a function of phonemes 212 which are either supplied to the sound recognizer 210 or stored locally within the sound recognizer 210. In a particular embodiment, the phonemes 212 are obtained from a subset of the n candidate languages which the system 200 is operable to identify. A small set of phonemes obtained from a subset of the n candidate languages can be used to identify a larger number of languages due to the observation that many languages employ the same phonemes, albeit differently in a phonotactical sense. In the present invention, the sound recognizer 210 generates vectors 240$_i$ and 260 which model the phonotactical characteristics of the supplied training or unknown language samples, using as its alphabet, the smaller phoneme set, that set including at least some phonemes which are reusable for two or more of the candidate languages. It is to be noted that while aforementioned generation of the training and unknown language vectors is described in terms of phonemes, it will be understood that any phonotactical marker may be used. In addition, an acoustically steady-state sound token may be used. Further, a phonetic subword such as syllable may be used as a sound token. The term "sound token" is used to describe each of these parameters.

The system 200 further includes a sound classifier 220 coupled to receive training vectors 240$_i$ during training mode operations, as well as an unknown language vector 260 during speech identification mode operations. The sound classifier is operable to identity the language of the unknown speech sample 250 as the language associated with the training vector exhibiting the closest correlation to the unknown language vector 260, a process of which is further detailed below.

Method of System Training

Figure 3:
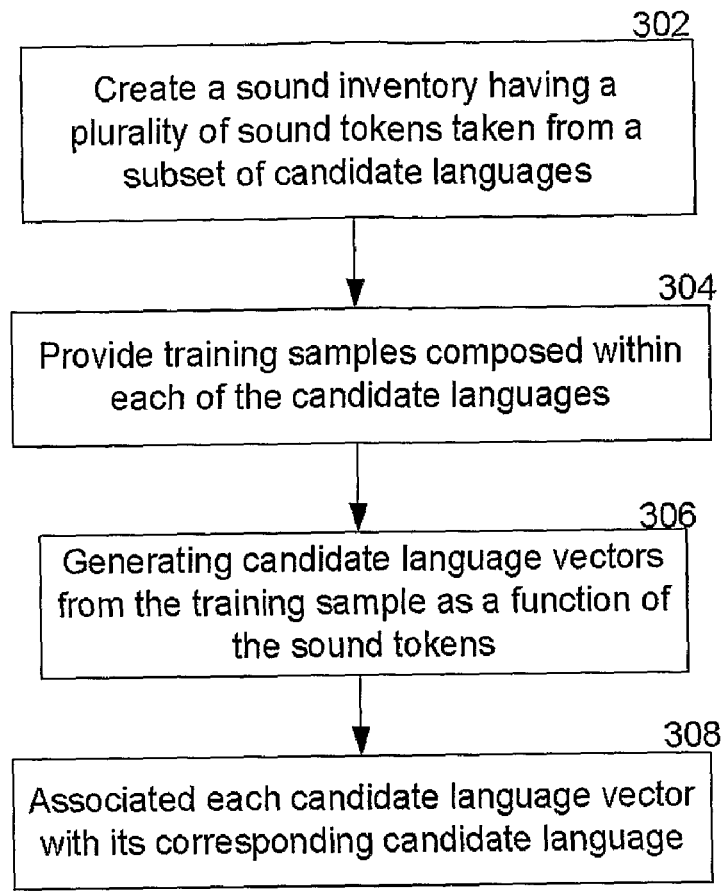
FIG. 3 illustrates a method for training the spoken language identification system in accordance with the present invention.

FIG. 3 illustrates a method for training the spoken language identification system 200 in accordance with the present invention. Initially at 302, a sound inventory (e.g., 212 in FIG. 2) is created with sound tokens that are taken from a subset of the candidate languages the system 200 is operable to identify. In an exemplary embodiment illustrated below, the sound inventory is composed of sound tokens from three languages, while the speech identification system is operable to identify six different candidate languages. Other arrangements are of course possible, for example, a system operable to identify multiple candidate languages using sound tokens from only a single one of them. As noted above, the sound inventory 212 may be formed as a part of the system 200, or located remotely therefrom.

At 304, training samples 230$_i$ composed within each of the candidate languages are provided. The training samples 230$_i$ may be provided locally within the system or supplied from an external source.

Next at 306, one or more training vectors 240$_i$ are generated from each of the training samples 230$_i$, the training vectors generated as a function of the aforementioned sound tokens.

For a system of V sound tokens, in one embodiment of this process, the training vectors 240$_i$ are composed of counts of sound tokens in the sound token sequence $m_1^n, \ldots, m_l^n, \ldots, m_L^n$, wherein n is the candidate language index, L is the length of the sound token sequence. Therefore, each training vector 240$_i$ has D=V dimension, each element represents the count of each sound token. Let v be $v^{th}$ sound token in the said sound inventory and $c_v^n$ be the number of occurrence of said $v^{th}$ sound token in said sound token sequence $m_1^n, \ldots, m_l^n, \ldots, m_L^n$ divided by the total number of occurrence of all the sound tokens.

$$c_v^n = \frac{c(v)}{\sum_v c(v)}$$

In another embodiment of the invention, the training vectors 240$_i$ are composed of counts of sound token pairs in the sound token sequence $m_1^n, \ldots, m_l^n, \ldots, m_L^n$. As a sound inventory of V sound tokens lead to N=V×V sound token pairs, each training vector 240$_i$ has N=V×V dimension, each element represents the count of each sound token pair $\{v_j v_k\}$.

$$c_{v_j v_k}^n = \frac{c(v_j v_k)}{\sum_{v_j v_k} c(v_j v_k)}$$

Another embodiments of this invention include larger phonotactic units such as sound token triplets, quartets. Those skilled in the art will appreciate that other embodiments are also possible in the present invention.

In a particular embodiment, process 306 is performed as a part of the sound recognizer processes in one embodiment of the invention described above. Further as noted above, each of the training samples 230$_i$ may include several speech utterances, each (or a combination of two or more) of which is used as the basis to generate a training vector 240$_i$, the collection of which may be used to form a statistical model for determining language identity of the unknown language sample. At 308, each training vector 240$_i$ is associated with the candidate language of the corresponding training sample 230. The collection of training vectors 240$_n$ associated with language n are used to represent the nth language. Further, a statistical model $\lambda_n$ is constructed for each language n based on the collection of training vectors 240$_n$. In this way, a collection of training vectors are represented by a statistical model. In an exemplary embodiment of this process, the arithmetic mean of the collection of training vectors is used to form a mean vector, said mean vector forming the basis of the statistical model $\lambda_n$.

Method of Language Identification

Figure 4:
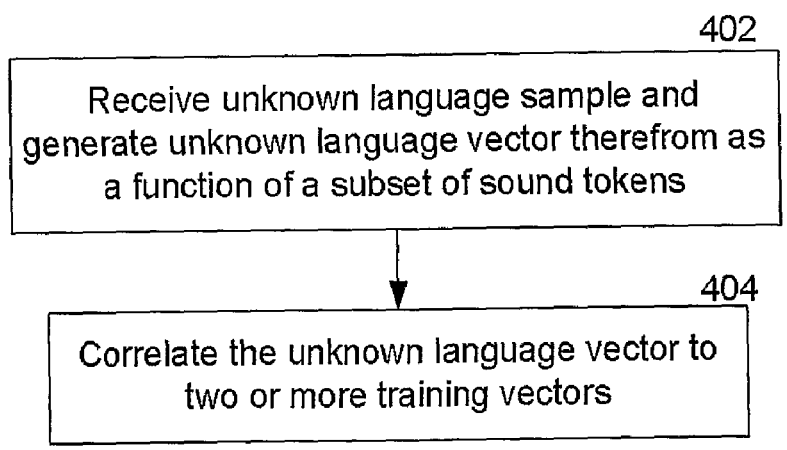
FIG. 4 illustrates a method for identifying the language of an unknown language sample in accordance with the present invention.

FIG. 4 illustrates a method for identifying the language of an unknown language sample in accordance with the present invention. The process largely builds upon the aforementioned training process in which the system 200 is trained to recognize n candidate languages using an alphabet of phonotactic markers taken from a subset of the candidate languages.

In the exemplary embodiment shown, the process begins at 402 in which an unknown language sample is received and an unknown language vector is generated therefrom, the unknown language vector defined as a function of the aforementioned sound tokens taken from a subset of the candidate languages. Exemplary embodiments of the unknown language vector include the vector of sound tokens or vector of sound token pairs, sound token triplets and quartets as described above.

At 404, the unknown language vector is correlated to one or more of the training vectors 240, wherein the language associated with the training vector having the closest correlation to the unknown language vector is identified as the language of the of the unknown language sample. In a particular embodiment of process 404, the unknown language vector X is extracted, and used to correlate with each of the training vector statistical models $\lambda_n$ to determine correlation between the unknown language vector and language n:

$$\hat{n} = \underset{n}{\mathrm{argmax}} P(X/\lambda_n)$$

with the statistical model exhibiting the closest correlation (exhibiting the highest probability) being deemed the optimal statistical model, and its corresponding language being adjudged the language of the unknown language sample.

In a further embodiment of the invention, frequency in terms of count of the sound tokens and their combinations in different orders such as pairs, triplets and quartets can be recorded and arranged in the language vectors. Implementation of such vectors enables a global assessment and correlation between the unknown language vector and the training vectors, or statistical model resulting from the training vectors, rather than the shorter duration analysis used in phone n-gram language models. The present invention not only incorporates the statistics of local sound token co-occurrences by using sound token pairs, triplets and quartets as the elements of language vector as in the prior art, but also incorporates the statistics of long distance, separated sound token in which sounds can be separated, for example, by 10-20 seconds and with hundreds of intervening sounds.

Exemplary System Embodiment & Performance

An exemplary implementation of the language identification system 200 was constructed to identifying six candidate languages Chinese Mandarin, Chinese Cantonese, Chinese Shanghai dialect, Japanese, Korean and English using phonemes from only three of these languages Chinese Mandarin, English and Korean. The system 200 implemented a preprocessing prior to the sound recognizer, including extracting, for each speech frame, a 39-dimensional feature vector consisting of 12 Mel Frequency Cepstral Coefficients and normalized energy, plus the first and second order derivatives. Sentence-based cepstral mean subtraction is applied for acoustic normalization in both in the training and identification modes. The 39 dimensional vector is subsequently supplied to the sound recognizer 210.

A training corpus of training samples 230 was used to train the sound inventory 210 required for later system use in the language identification mode. Typically about 10 hours of speech is required for training. The specific embodiment tested used telephony speech input digitized with a sampling rate of 8 kHz. It used 124 phonemes consisting of 43, 44 and 37 phonemes respectively from combining Chinese Mandarin, English and Korean into a training corpus. Consistent with the terminology in the application, each of these phonemes is called a "sound token". As noted above, the inventory of basic "sound token" can be defined as a set of phonemes, acoustically steady sound tokens, and the like.

Each sound token was modeled by a left-to-right three-emitting-state CDHMM, each state having 32 Gaussian mixture components. In addition to the 124 sound tokens emitted from these states, multiple noise models were built to absorb noise events of different kinds. A set of flat models based on a broad "sound" definition is used as the reference ground to obtain the acoustic confidence score. An adaptive voice detector was used to detect the start and end point of the speech. The sound classifier 220 is implemented as a support vector machine (SVM), although in other implementation, latent semantic analysis (LSA), an artificial neural network, or any other high dimensional vector classifier may be used. During language identification operations, the sound recognizer 210 converts the input speech of unknown language into sound sequences. The sound classifier first extracts the unknown language vector from the sequences, and then measures the unknown language vector against all the training vectors of interests, the language whose training vector gives rise to the highest similarity scores to the unknown language vector, was identified as the result language. The length of the time window used in the sound classifier is varied from 5 to 10 to 15 seconds. The number of training exemplars is varied from 100 to 3000.

Figures 5A, 5B, 6:
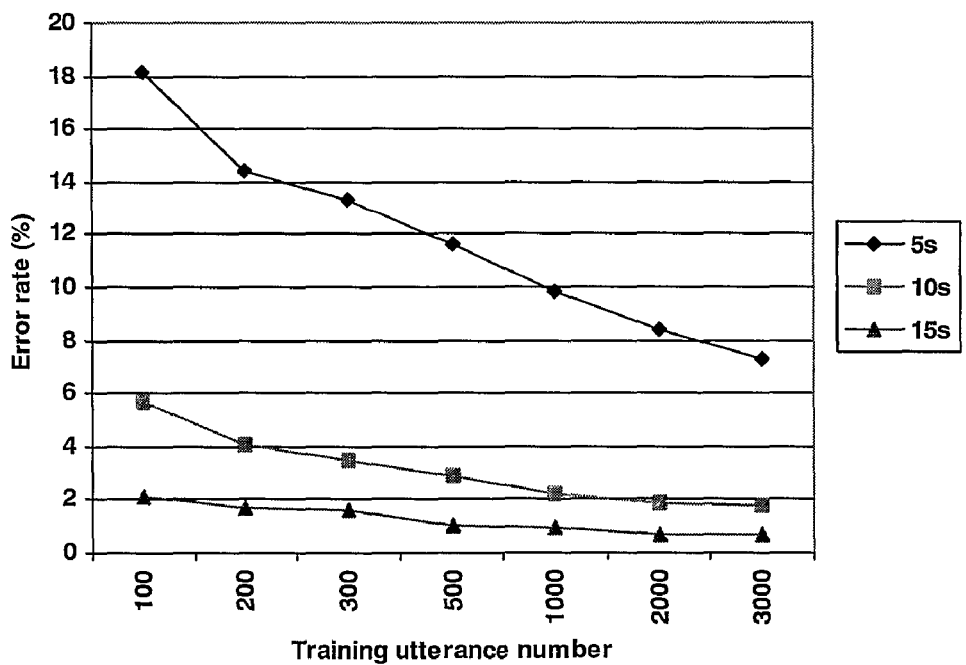
FIG. 5A illustrate classification error rates of the spoken language identification system provide in accordance with the present invention.
FIG. 5B illustrate the classification error rates of the spoken language identification system of the present invention as compared to a prior art acoustic-phonotactic system.
FIG. 6 illustrates exemplary classification error rates as a function of training data for the spoken language identification system of the present invention.

FIG. 5A illustrate classification error rates of the spoken language identification system as reported in "Spoken Language Identification Using Bag of Sounds," authors Ma Bin and Li Haizhou (Mar. 21, 2005, International Conference on Chinese Computing 2005), herein incorporated by reference. For each language, separate databases for training and testing the sound classifier 220 was constructed, and the training databases was not used in testing.

For each test set at 5, 10 and 15 seconds, 2,000 training vectors were used to build the SVM classifier 220. The testing corpus included 500 unknown language vectors of 5, 10 and 15 seconds. FIG. 5A shows that longer input utterances lead to much better classification accuracy, which is as expected. The average accuracy for six languages in the 10-second test is 98.1% in accuracy or 1.9% in error rate.

FIG. 5B illustrate the classification error rates of the spoken language identification system (identified as BOS) as compared to a prior art acoustic-phonotactic system (identified as AP) as reported in the aforementioned article to Ma Bin. The test included the three baseline languages, Chinese Mandarin, English and Korean. Three mono-lingual phoneme recognizers were constructed as well as their respective phoneme bi-gram language models. A phone loop grammar was used in acoustic decoding, and the phoneme bi-gram was used to derive final phoneme sequences. An unknown language sample is provided through three parallel acoustic-phonotactic decoders, the winner of combined acoustic and language model scores takes all. The greatly improved accuracy provided by the present invention over the prior art acoustic-phonotactic system is readily apparent.

FIG. 6 illustrates exemplary classification error rates as a function of the number of training samples for the spoken language identification system of the present invention. The number of training samples was varied from 100 to 3,000 for each training sample of 5, 10 and 15 seconds. The data indicates that fewer training samples of longer duration are needed. For example, only 100 15 second duration training sessions are needed to provide an acceptable error rate of approximately 2 percent, whereas approximately 2000 ten second training samples are needed to achieve the same accuracy.

As readily appreciated by those skilled in the art, the described processes may be implemented in hardware, software, firmware or a combination of these implementations as appropriate. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of training a spoken language identification system to identify an unknown language as one of a plurality of known candidate languages, the method comprising:
   creating a sound inventory comprising a plurality of sound tokens, the collective plurality of sound tokens provided from a subset of the known candidate languages;
   providing a sound recognizer with a plurality of training samples in a database, each training sample composed within one of the known candidate languages;
   generating one or more training vectors by the sound recognizer from each training sample, wherein each training vector is defined as a function of said plurality of sound tokens provided from said subset of the known candidate languages, wherein each element of the training vector is a function of the respective sound token according to a sound token sequence; and
   associating each training vector with the candidate language of the corresponding training sample.

2. The method of claim 1, wherein the sound inventory comprises a plurality of V sound tokens, the training vector comprising counts of sound tokens in the sound token sequence $m_1^n, \ldots, m_l^n, \ldots, m_L^n$, wherein n is the candidate language index, L is the length of the sound token sequence, wherein said sound token count comprises $c_v^n$, where v is defined as the $v^{th}$ sound token in the said sound inventory and $c_v^n$, is defined as the number of occurrences of said $v^{th}$ sound token in said sound token sequence $m_1^n, \ldots, m_l^n, \ldots, m_L^n$ divided by the total number of occurrences of all the sound tokens:

$$c_v^n = \frac{c(v)}{\sum_v c(v)}.$$

3. The method of claim 1, wherein the sound inventory comprises a plurality of V sound tokens, the training vector comprising counts of sound token pairs in the sound token sequence $m_1^n, \ldots, m_l^n, \ldots, m_L^n$, wherein n is the candidate language index, L is the length of the sound token sequence, wherein said count of sound token pairs comprises $c_{v_j v_k}^n$, where $v_j, v_k$ is defined as the number of occurrences of the sound token pairs in said sound token sequence $m_1^n, \ldots, m_l^n, \ldots, m_L^n$ divided by the total number of occurrences of all the sound token pairs $\{v_j v_k\}$:

$$c_{v_j v_k}^n = \frac{c(v_j v_k)}{\sum_{v_j v_k} c(v_j v_k)}.$$

4. The method of claim 1, wherein the sound inventory comprises a plurality of sound tokens, and wherein the training vector comprises counts of sound token triplets.

5. The method of claim 1, wherein the sound inventory comprises a plurality of sound tokens, and wherein the training vector comprises counts of sound token quartets.

6. The method of claim 1, wherein generating one or more training vectors comprises generating a plurality of training vectors corresponding to one candidate language, the method further comprising constructing a statistical model from the plurality of the training vectors associated with the candidate language.

7. The method of claim 6, wherein an arithmetic mean of said plurality of training vectors is used to form a mean training vector, said mean training vector forming the basis of the statistical model $\lambda_n$ used to determine the correlation between said mean training vector and an unknown training vector associated with an unknown language sample.

8. A spoken language identification system operable to identify the language of an unknown language sample as one or a plurality of known candidate languages, the language identification system including:
   (i) means for creating a sound inventory comprising a plurality of sound tokens, the collective plurality of sound tokens provided from a subset of the known candidate languages,
   (ii) means for providing a training sample composed within each of the known candidate languages,
   (iii) means for generating one or more training vectors from each training sample, wherein each training vector is defined as a function of said plurality of sound tokens provided from said subset of the known candidate languages, wherein each element of the training vector is a function of the respective sound token according to a sound token sequence,
   (iv) means for associating each training vector with the candidate language of the corresponding training sample, and
   (v) means for identifying the language of the unknown speech sample, comprising
   means for generating an unknown language vector from the unknown language sample, the unknown language vector defined as a function of said plurality of sound tokens provided from said subset of the known candidate languages; and
   means for correlating the unknown language vector to a plurality of the training vectors,
   wherein the language associated with the training vector having the closest correlation to the unknown language vector is identified as the language of the unknown language sample.

9. The language identification system of the claim 8, wherein one or more training vectors corresponding to the candidate language n are represented by a statistical model $\lambda_n$, and wherein correlating comprises correlating the unknown language vector X to one or more of the training vector statistical models $\lambda$ to determine correlation between the unknown language vector and language n:

$$\hat{n} = \underset{n}{\mathrm{argmax}} P(X/\lambda_n)$$

whereby, the statistical model exhibiting the highest probability being deemed the optimal statistical model, and its corresponding language being adjudged the language of the unknown language sample.

10. A computer program product, resident on a computer readable medium, operable to control a programmable system to train a spoken language identification system to identify an unknown language as one of a plurality of known candidate languages, the computer program product comprising:

instruction code to create a sound inventory comprising a plurality of sound tokens, the collective plurality of sound tokens provided from a subset of the known candidate languages;

instruction code to provide a plurality of training samples, each training sample composed within one of the known candidate languages;

instruction code to generate one or more training vectors from each training sample, wherein each training vector is defined as a function of said plurality of sound tokens provided from said subset of the known candidate languages, wherein each element of the training vector is a function of the respective sound token according to a sound token sequence; and instruction code to associate each training vector with the candidate language of the corresponding training sample.

11. The computer program product of claim 10, wherein the sound inventory comprises a plurality of V sound tokens, each training vector comprising counts of sound tokens in the sound token sequence $m_1^n, \ldots, m_l^n, \ldots, m_L^n$, wherein n is the candidate language index, L is the length of the sound token sequence, wherein said sound token count comprises $c_v^n$, where v is defined as the $v^{th}$ sound token in the said sound inventory and $c_v^n$ is defined as the number of occurrences of said $v^{th}$ sound token in said sound token sequence $m_1^n, \ldots, m_l^n, \ldots, m_L^n$ divided by the total number of occurrences of all the sound tokens:

$$\hat{c}_v^n = \frac{c(v)}{\sum_v c(v)}.$$

12. The computer program product of claim 10, wherein the sound inventory comprises a plurality of V sound tokens, each training vector comprising counts of sound token pairs in the sound token sequence $m_1^n, \ldots, m_l^n, \ldots, m_L^n$, wherein n is the candidate language index, L is the length of the sound token sequence, wherein said count of sound token pairs comprises $c_{v_j v_k}^n$, where $v_j, v_k$ is defined as the number of occurrences of the sound token pairs in said sound token sequence $m_1^n, \ldots, m_l^n, \ldots, m_L^n$ divided by the total number of occurrences of all the sound token pairs $\{v_j v_k\}$:

$$c_{v_j v_k}^n = \frac{c(v_j v_k)}{\sum_{v_j v_k} c(v_j v_k)}.$$

13. The computer program product of claim 10, wherein the sound inventory comprises a plurality of sound tokens, and wherein the training vector comprises counts of sound token triplets.

14. The computer program product of claim 10, wherein the sound inventory comprises a plurality of sound tokens, and wherein the training vector comprises counts of sound token quartets.

15. The computer program product of claim 10, wherein the instruction code to generate one or more training vectors comprises instruction code to generate a plurality of training vectors corresponding to one candidate language, the computer program product further comprising instruction code to construct a statistical model from the plurality of the training vectors associated with the candidate language.

16. The computer program product of claim 15, wherein the arithmetic mean of said plurality of training vectors is used to form a mean training vector, said mean training vector forming the basis of the statistical model $\lambda_n$ used to determine the correlation between said mean training vector and an unknown training vector associated with an unknown language sample.

17. A method of operating a spoken language identification system to identify an unknown language as one of a plurality of known candidate languages, the method comprising:

creating a sound inventory comprising a plurality of sound tokens, the collective plurality of sound tokens provided from a subset of the known candidate languages;

providing a sound recognizer with a plurality of training samples in a database, each training sample composed within one of the known candidate languages;

generating one or more training vectors by the sound recognizer from each training sample, wherein each training vector is defined as a function of said plurality of sound tokens provided from said subset of the known candidate languages, wherein each element of the training vector is a function of the respective sound token according to a sound token sequence;

associating each training vector with the candidate language of the corresponding training sample;

generating an unknown language vector by the sound recognizer from the unknown language sample, the unknown language vector defined as a function of said plurality of sound tokens provided from said subset of the known candidate languages; and correlating the unknown language vector to a plurality of the training vectors;

wherein the language associated with the training vector having the closest correlation to the unknown language vector is identified as the language of the unknown language sample.

18. The method of the claim 17, wherein one or more training vectors corresponding to the candidate language n are represented by a statistical model $\lambda_n$, and wherein correlating comprises correlating the unknown language vector X to one or more of the training vector statistical models $\lambda$ to determine correlation between the unknown language vector and language n:

$$\hat{n} = \underset{n}{\mathrm{argmax}} P(X / \lambda_n)$$

whereby, the statistical model exhibiting the highest probability being deemed the optimal statistical model, and its corresponding language being adjudged the language of the unknown language sample.

* * * * *